United States Patent
Yang et al.

(10) Patent No.: US 10,516,460 B2
(45) Date of Patent: Dec. 24, 2019

(54) METHOD AND APPARATUS FOR TRANSMITTING AND RECEIVING WIRELESS SIGNAL IN WIRELESS COMMUNICATION SYSTEM

(71) Applicant: LG ELECTRONICS INC., Seoul (KR)

(72) Inventors: Suckchel Yang, Seoul (KR); Kijun Kim, Seoul (KR); Eunsun Kim, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/079,821

(22) PCT Filed: Feb. 27, 2017

(86) PCT No.: PCT/KR2017/002174
§ 371 (c)(1),
(2) Date: Aug. 24, 2018

(87) PCT Pub. No.: WO2017/146556
PCT Pub. Date: Aug. 31, 2017

(65) Prior Publication Data
US 2019/0058516 A1    Feb. 21, 2019

Related U.S. Application Data
(60) Provisional application No. 62/300,094, filed on Feb. 26, 2016, provisional application No. 62/306,004, (Continued)

(51) Int. Cl.
*H04K 1/10*     (2006.01)
*H04L 27/28*    (2006.01)
(Continued)

(52) U.S. Cl.
CPC ......... *H04B 7/0626* (2013.01); *H04B 7/0495* (2013.01); *H04L 27/2607* (2013.01);
(Continued)

(58) Field of Classification Search
CPC . H04B 7/0626; H04B 7/70495; H04W 72/04; H04W 72/0446; H04W 74/0841;
(Continued)

(56) References Cited

U.S. PATENT DOCUMENTS

| | | | | |
|---|---|---|---|---|
| 8,964,671 B2 * | 2/2015 | Taoka | .................. | H04L 1/0073 370/329 |
| 2011/0110444 A1 * | 5/2011 | Roh | ...................... | H04L 1/0003 375/260 |

(Continued)

FOREIGN PATENT DOCUMENTS

| | | | |
|---|---|---|---|
| WO | WO 2014/166060 A1 | 10/2014 | |
| WO | WO 2015/023227 A1 | 2/2015 | |

OTHER PUBLICATIONS

Huawei et al., "Discussion on New Frame Structure for Latency Reduction in TDD," 3GPP TSG RAN WG1 Meeting #84, R1-160754, St. Julian's, Malta, Feb. 15-19, 2016, 9 pages.

*Primary Examiner* — Phuong Phu
(74) *Attorney, Agent, or Firm* — Birch, Stewart, Kolasch & Birch, LLP

(57) ABSTRACT

The present invention relates to a wireless communication system, and specifically to a method and an apparatus therefor, the method comprising the steps of: identifying static resource in a subframe set; and transmitting and receiving data using the remaining resource, excluding the static resource, in the subframe set, wherein the remaining resource is used for downlink (DL) reception of used for uplink (UL) transmission according to an instruction by a base station.

10 Claims, 10 Drawing Sheets

Related U.S. Application Data filed on Mar. 9, 2016, provisional application No. 62/353,125, filed on Jun. 22, 2016, provisional application No. 62/411,687, filed on Oct. 23, 2016.

(51) Int. Cl.
*H04B 7/06* (2006.01)
*H04W 72/04* (2009.01)
*H04B 7/0495* (2017.01)
*H04L 27/26* (2006.01)
*H04W 74/08* (2009.01)

(52) U.S. Cl.
CPC ......... *H04L 27/2666* (2013.01); *H04W 72/04* (2013.01); *H04W 72/0446* (2013.01); *H04W 74/0841* (2013.01)

(58) Field of Classification Search
CPC ............ H04L 27/2607; H04L 27/2666; H04L 1/0073; H04L 1/0033
USPC .......................... 375/260, 219, 220, 222, 346
See application file for complete search history.

(56) References Cited

U.S. PATENT DOCUMENTS

| | | |
|---|---|---|
| 2012/0300681 A1 | 11/2012 | Ji et al. |
| 2015/0055584 A1 | 2/2015 | Lee et al. |
| 2015/0124663 A1 | 5/2015 | Chen et al. |

\* cited by examiner

METHOD AND APPARATUS FOR TRANSMITTING AND RECEIVING WIRELESS SIGNAL IN WIRELESS COMMUNICATION SYSTEM

CROSS REFERENCE TO RELATED APPLICATIONS

This application is the National Phase of PCT/KR2017/002174 filed on Feb. 27, 2017, which claims priority under 35 U.S.C. § 119(e) to U.S. Provisional Application Nos. 62/300,094; 62/306,004; 62/353,125; and 62/411,687, respectively filed on Feb. 26, 2016; Mar. 9, 2016; Jun. 22, 2016; and Oct. 23, 2016, all of which are hereby expressly incorporated by reference into the present application.

TECHNICAL FIELD

The present invention relates to a wireless communication system, and more particularly, to a method and apparatus for transmitting/receiving a wireless signal. The wireless communication system includes a CA-based (Carrier Aggregation-based) wireless communication system.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE OF THE INVENTION

Technical Task

An object of the present invention is to provide a method of efficiently transmitting/receiving control information in a wireless communication and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of performing communication, which is performed by a user equipment in a wireless communication system, includes the steps of identifying a static resource in a subframe set, and transmitting and receiving data using the remaining resources except the static resource in the subframe set. In this case, the remaining resources can be used for downlink (DL) reception or uplink (UL) transmission according to an indication of a base station.

To further achieve these and other advantages and in accordance with the purpose of the present invention, according to a different embodiment, a user equipment in a wireless communication system includes an RF (radio frequency) module and a processor, the processor configured to identify a static resource in a subframe set, the processor configured to transmit and receive data using the remaining resources except the static resource in the subframe set. In this case, the remaining resources can be used for downlink (DL) reception or uplink (UL) transmission according to an indication of a base station.

Preferably, the static resource includes a DL resource periodically configured to receive a specific DL signal and the specific signal can include at least one selected from the group consisting of a TRS (tracking reference signal), a CSI-RS (channel state information RS), an RRM-RS (radio resource management RS), a synchronization signal, and a system information signal. In this case, if the static resource is overlapped with a scheduled UL data transmission resource, UL data transmission may not be performed in a resource at which the static resource and the scheduled UL data transmission resource are overlapped and a GP (guard period) appearing after the resource.

Preferably, the static resource includes a UL resource periodically configured to transmit a specific UL signal and the specific signal can include at least one selected from the group consisting of an SR (scheduling request), periodic CSI (channel state information), a periodic SRS (sounding reference signal), a PRACH (physical random access channel), and CB-ULTX (contention-based uplink transmission). In this case, if the static resource is overlapped with a scheduled DL data transmission resource, DL data transmission may not be performed in a resource at which the static resource and the scheduled DL data transmission resource are overlapped and a GP (guard period) appearing prior to the resource.

Advantageous Effects

According to the present invention, wireless signal transmission and reception can be efficiently performed in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

Figure 1:
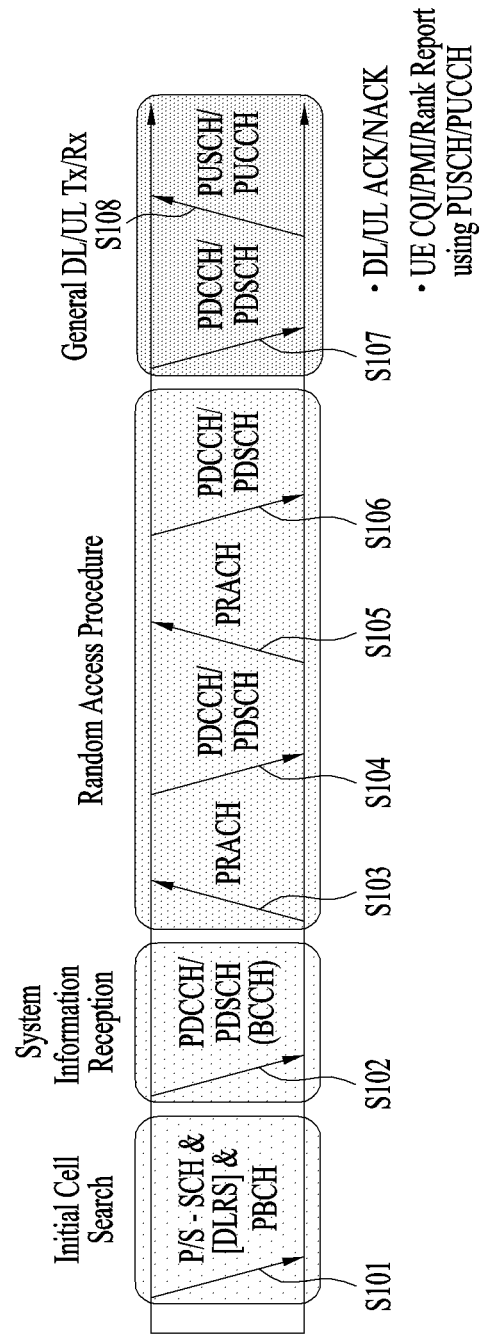
FIG. 1 illustrates physical channels used in 3GPP LTE(-A) and a signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
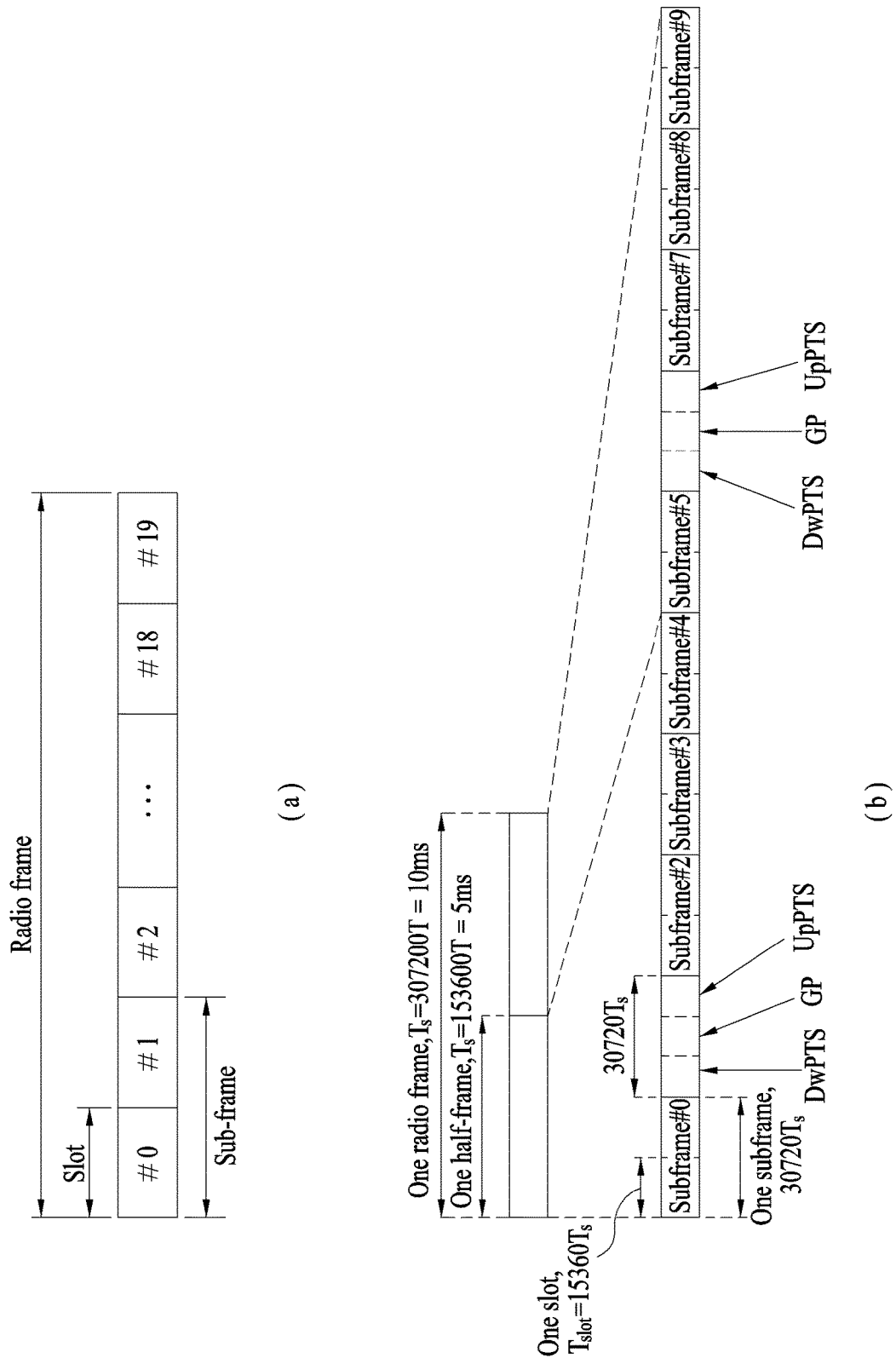
FIG. 2 illustrates a radio frame structure.

FIG. 2 illustrates a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2(*a*) illustrates a type-1 radio frame structure. A downlink subframe includes 10 subframes each of which includes 2 slots in the time domain. A time for transmitting a subframe is defined as a transmission time interval (TTI). For example, each subframe has a duration of 1ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(*b*) illustrates a type-2 radio frame structure. The type-2 radio frame includes 2 half frames. Each half frame includes 4(5) normal subframes and 10 special subframes.

The normal subframes are used for uplink or downlink according to UL-DL configuration. A subframe is composed of 2 slots.

Table 1 shows subframe configurations in a radio frame according to UL-DL configurations.

TABLE 1

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
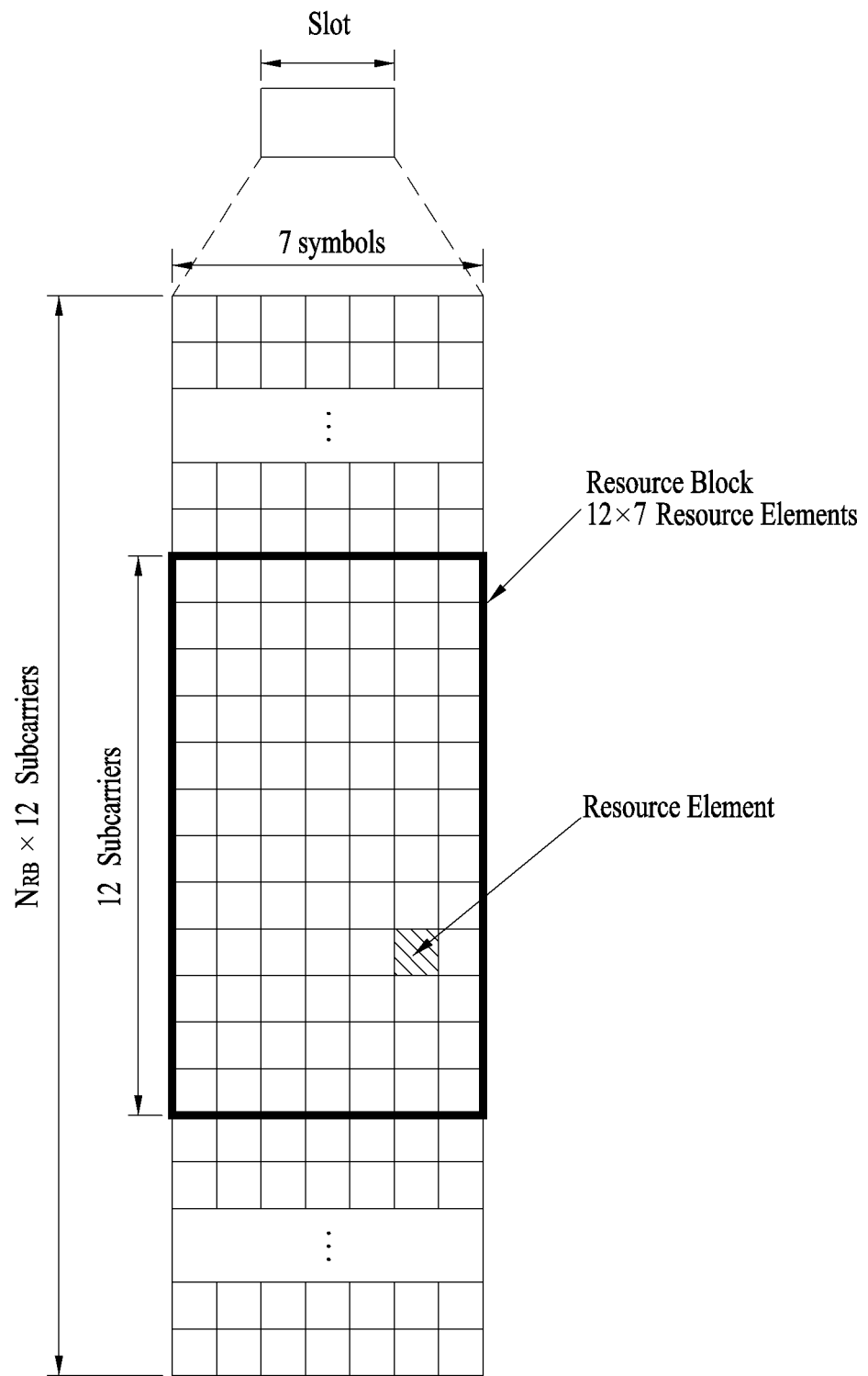
FIG. 3 illustrates a resource grid of a downlink slot.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present invention is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

Figure 4:
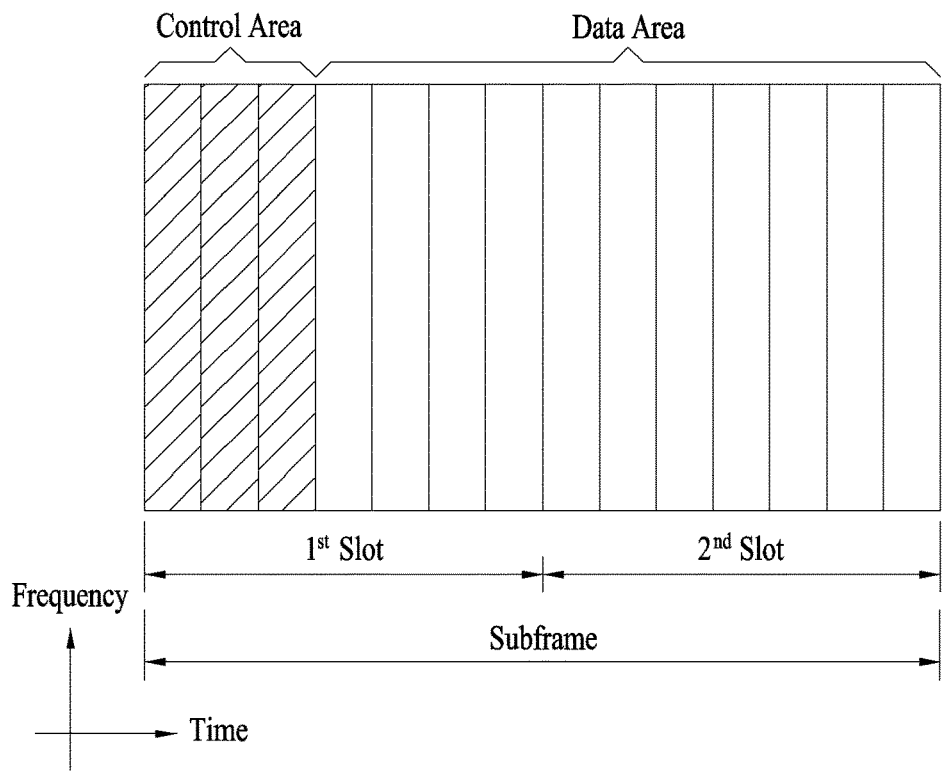
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. A arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4 QPSK symbols are mapped to one REG. REs allocated to a reference signal are not included in an REG, and thus the total number of REGs in OFDM symbols depends on presence or absence of a cell-specific reference signal. The concept of REG (i.e. group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Figure 5:
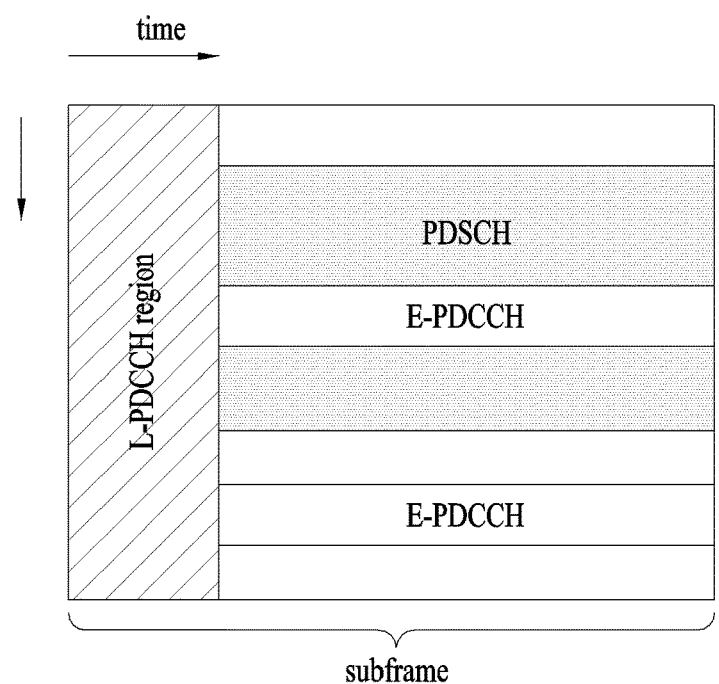
FIG. 5 illustrates an example of Enhanced Physical Downlink Control Channel (EPDCCH).

Transmission Mode (TM)
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO (Multiple Input Multiple Output)
Transmission mode 6: Closed-loop rank-1 precoding
Transmission mode 7: Single-antenna port (ports) transmission
Transmission mode 8: Double layer transmission (ports 7 and 8) or single-antenna port (port 7 or 8) transmission
Transmission mode 9: Transmission through up to 8 layers (ports 7 to 14) or single-antenna port (port 7 or 8) transmission DCI Format
Format 0: Resource grants for PUSCH transmission
Format 1: Resource assignments for single codeword PDSCH transmission (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments FIG. 5 illustrates an EPDCCH. The EPDCCH is a channel additionally introduced in LTE-A.

Referring to FIG. 5, a PDCCH (for convenience, legacy PDCCH or L-PDCCH) according to legacy LTE may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similarly to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type. In this specification, the PDCCH includes both L-PDCCH and EPDCCH unless otherwise noted.

Figure 6:
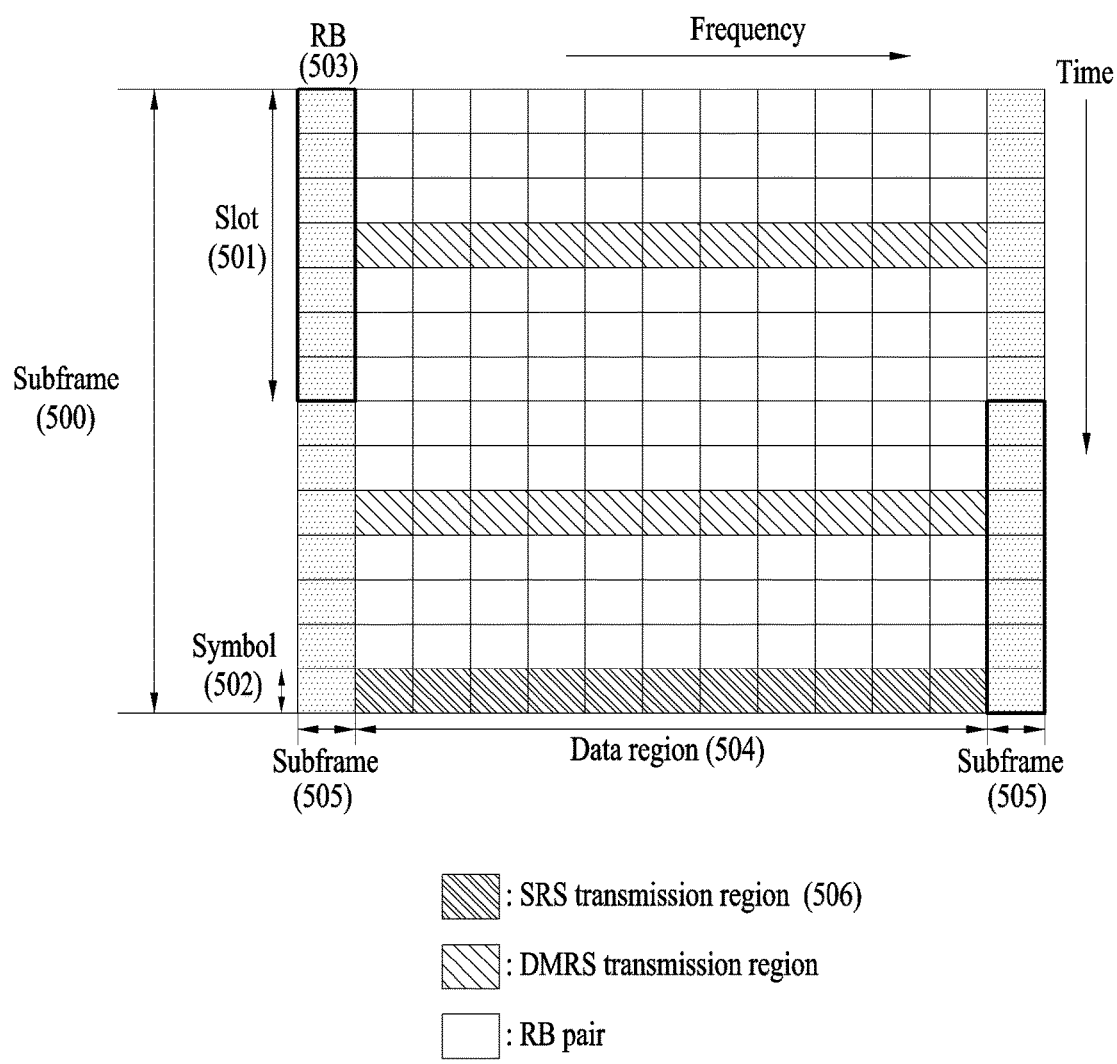
FIG. 6 illustrates the structure of an uplink subframe used in LTE(-A).

FIG. 6 illustrates a structure of an uplink subframe used in LTE(-A).

Referring to FIG. 6, a subframe 500 is composed of two 0.5 ms slots 501. Assuming a length of a normal cyclic prefix (CP), each slot is composed of 7 symbols 502 and one symbol corresponds to one SC-FDMA symbol. A resource block (RB) 503 is a resource allocation unit corresponding to 12 subcarriers in the frequency domain and one slot in the time domain. The structure of the uplink subframe of LTE(-A) is largely divided into a data region 504 and a control region 505. A data region refers to a communication resource used for transmission of data such as voice, a packet, etc. transmitted to each UE and includes a physical uplink shared channel (PUSCH). A control region refers to a communication resource for transmission of an uplink control signal, for example, downlink channel quality report from each UE, reception ACK/NACK for a downlink signal, uplink scheduling request, etc. and includes a physical uplink control channel (PUCCH). A sounding reference signal (SRS) is transmitted through an SC-FDMA symbol that is lastly positioned in the time axis in one subframe. SRSs of a plurality of UEs, which are transmitted to the last SC-FDMAs of the same subframe, can be differentiated according to frequency positions/sequences. The SRS is used to transmit an uplink channel state to an eNB and is periodically transmitted according to a subframe period/offset set by a higher layer (e.g., RRC layer) or aperiodically transmitted at the request of the eNB.

Next, HARQ (Hybrid Automatic Repeat reQuest) will be described. When a plurality of UEs has data to be transmitted on uplink/downlink in a wireless communication, an eNB selects UEs which will transmit data per transmission time internal (TTI) (e.g., subframe). In a system using multiple carriers and the like, an eNB selects UEs which will transmit data on uplink/downlink per TTI and also selects a frequency band to be used for data transmission of the corresponding UEs.

When description is based on uplink (UL), UEs transmit reference signals (or pilot signals) on uplink and an eNB detects channel states of the UEs using the reference signals transmitted from the UEs and selects UEs which will transmit data on uplink in each unit frequency band per TTI. The eNB notifies the UEs of the result of selection. That is, the eNB transmits, to UL scheduled UEs, a UL assignment message indicating that the UEs may transmit data using a specific frequency band in a specific TTI. The UL assignment message is also referred to as a UL grant. The UEs transmit data on uplink according to the UL assignment message. The UL assignment message may include UE identity (ID), RB allocation information, a modulation and coding scheme (MCS), a redundancy version (RV), new data indication (NDI) and the like.

In the case of a synchronous non-adaptive HARQ method, a retransmission time is appointed in the system (e.g., after 4 subframes from a NACK reception time). Accordingly, the eNB may send a UL grant message to UEs only in initial transmission and subsequent retransmission is performed according to an ACK/NACK signal (e.g., PHICH signal). On the other hand, in the case of an asynchronous adaptive HARQ method, a retransmission time is not appointed and thus the eNB needs to send a retransmission request message to UEs. Further, the retransmission request message may include UE ID, RB allocation information, HARQ process ID/number, RV and NDI information because frequency resources or an MCS for retransmission vary with transmission time.

Figure 7:
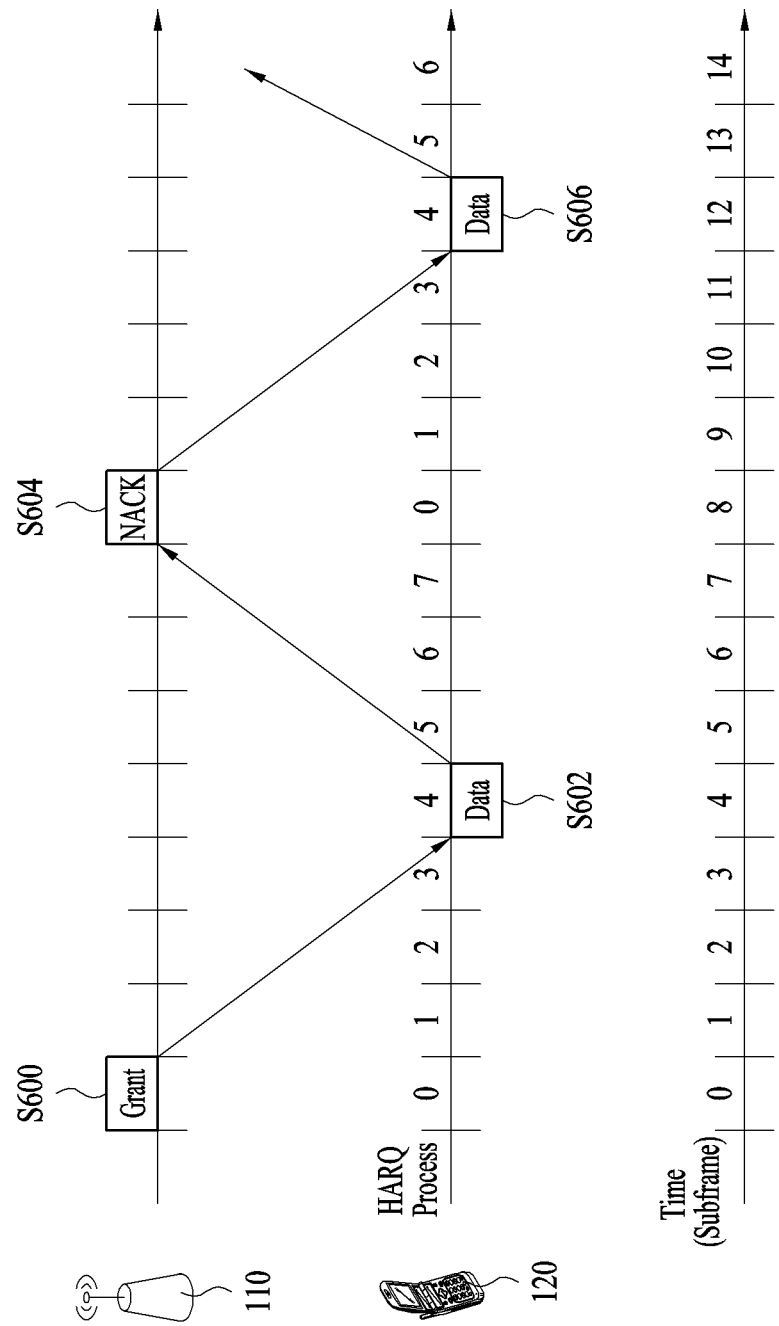
FIG. 7 illustrates UL HARQ (Uplink Hybrid Automatic Repeat reQuest) operation.

FIG. 7 illustrates a UL HARQ operation in an LTE(-A) system. In the LTE(-A) system, the asynchronous adaptive HARQ method is used as a UL HARQ method. When 8-channel HARQ is used, 0 to 7 are provided as HARQ process numbers. One HARQ process operates per TTI (e.g., subframe). Referring to FIG. 7, a UL grant is transmitted to a UE 120 through a PDCCH (S600). The UE 120 transmits UL data to an eNB 110 after 4 subframes from the time (e.g., subframe 0) at which the UL grant is received using an RB and an MCS designated by the UL grant (S602). The eNB 110 decodes the UL data received from the UE 120 and then generates ACK/NACK. When decoding of the UL data fails, the eNB 110 transmits NACK to the UE 120 (S604). The UE 120 retransmits the UL data after 4 subframes from the time at which NACK is received (S606). Initial transmission and retransmission of the UL data are performed through the same HARQ process (e.g., HARQ process 4). ACK/NACK information may be transmitted through a PHICH.

Figure 8:
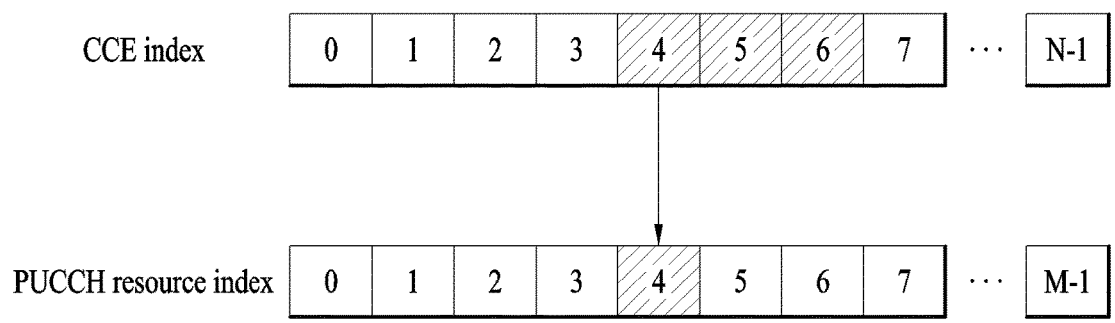
FIG. 8 illustrates an example of determining a PUCCH resource for ACK/NACK.

FIG. 8 illustrates an example of determining a PUCCH resource for ACK/NACK. In LTE system, a PUCCH resource for ACK/NACK is not allocated to each of UEs in advance. A plurality of UEs belonging to a cell use multiple PUCCH resources in a manner of sharing the resources at every timing. Specifically, when a UE uses a PUCCH resource to transmit ACK/NACK, the PUCCH resource corresponds to a PDCCH on which scheduling information on downlink data is carried. In each downlink subframe, a region in which PDCCH is transmitted is configured by a plurality of CCEs (control channel elements) and a PDCCH transmitted to a UE is configured by one or more CCEs. Having received the CCEs constructing the PDCCH, the UE transmits ACK/NACK via a PUCCH resource corresponding to a specific CCE (e.g., first CCE) among the CCEs.

Referring to FIG. 8, in a downlink component carrier (DL CC), each rectangular corresponds to a CCE. In an uplink component carrier (UL CC), each rectangular corresponds to a PUCCH resource. A PUCCH index corresponds to a PUCCH resource for transmitting ACK/NACK. As shown in FIG. 8, if information on a PDSCH is forwarded via a PDCCH consisting of CCEs having indexes 4 to 6, a UE transmits ACK/NACK via a 4$^{th}$ PUCCH corresponding to a 4$^{th}$ CCE, which is a first CCE among the CCEs constructing the PDCCH. FIG. 8 illustrates a case that the maximum M numbers of PUCCHs exist in a UL CC when the maximum N numbers of CCEs exist in a DL CC. Although the N is equal to the M, the M can be configured to be different from the N to make CCE mapping to be overlapped with PUCCH mapping.

Specifically, a PUCCH resource index can be determined as follows in LTE system.

$$n^{(1)}_{PUCCH} = n_{CCE} + N^{(1)}_{PUCCH} \qquad \text{[Equation 1]}$$

In this case, $n^{(1)}_{PUCCH}$ corresponds to a resource index of a PUCCH format 1a/1b for transmitting ACK/NACK/DTX, $N^{(1)}_{PUCCH}$ corresponds to a signaling value forwarded from a higher layer, and $n_{CCE}$ corresponds to a smallest value among CCE indexes used for transmitting PDCCH. It is able to obtain a cyclic shift for a PUCCH format 1a/1b, an orthogonal spreading code, and a PRB (physical resource block) from the $n^{(1)}_{PUCCH}$.

Figure 9:
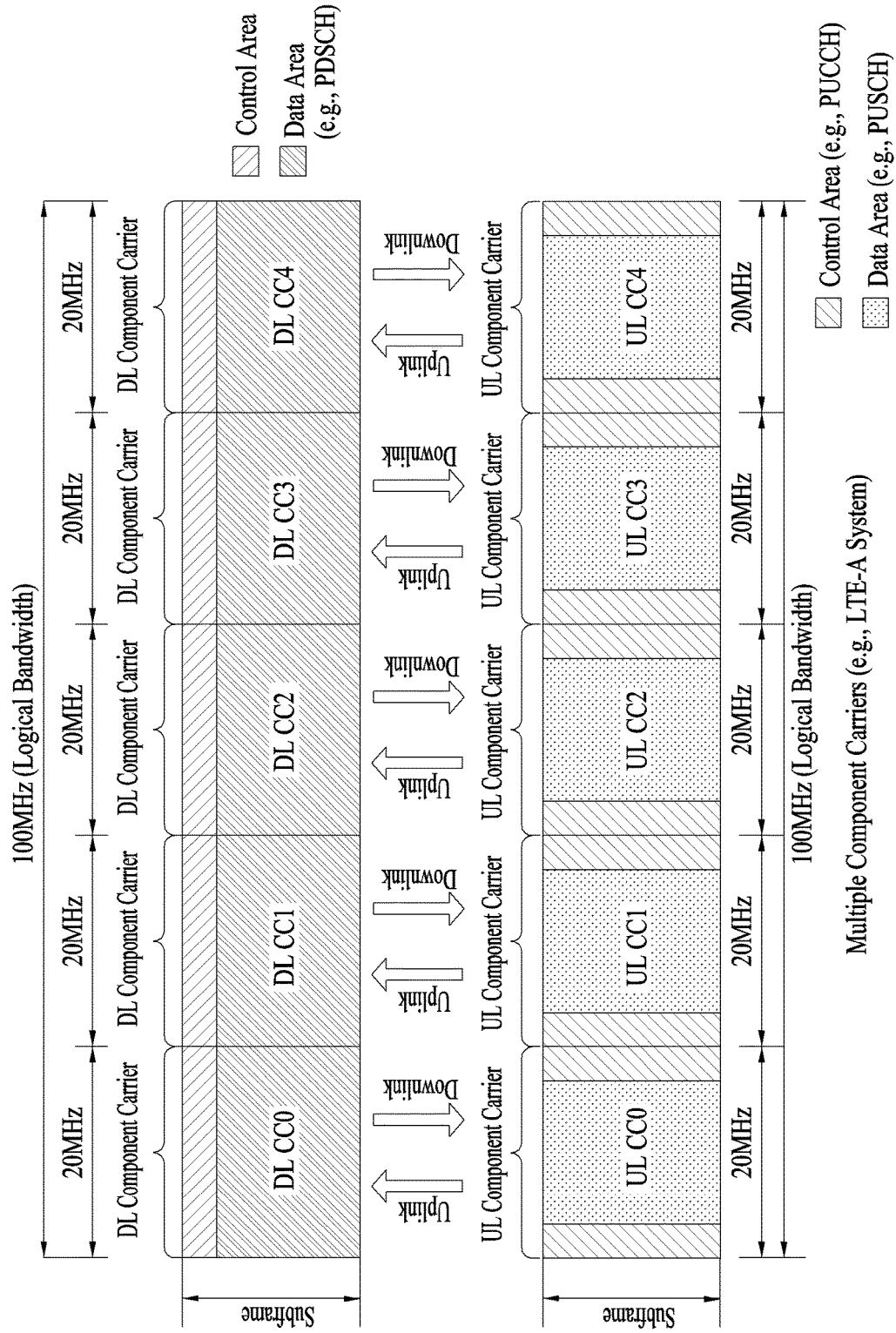
FIG. 9 illustrates a carrier aggregation (CA)-based wireless communication system.

FIG. 9 illustrates carrier aggregation (CA) communication system.

Referring to FIG. 9, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. Control information may be transmitted/received only through a specific CC. This specific CC may be referred to as a primary CC and other CCs may be referred to as secondary CCs. For example, when cross-carrier scheduling (or cross-CC scheduling) is applied, a PDCCH for downlink allocation can be transmitted on DL CC #0 and a PDSCH corresponding thereto can be transmitted on DL CC #2. The term "component carrier" may be replaced by other equivalent terms (e.g. "carrier", "cell", etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.
   No CIF
CIF enabled: a PDCCH on a DL CC can be used to allocate a PDSCH or PUSCH resource on a specific DL/UL CC from among a plurality of aggregated DL/UL CCs using the CIF.
   LTE DCI format extended to have CIF
      CIF corresponds to a fixed x-bit field (e.g. x=3) (when CIF is set)
      CIF position is fixed irrespective of DIC format size (when CIF is set)

When the CIF is present, the BS may allocate a monitoring DL CC (set) to reduce BD complexity of the UE. For PDSCH/PUSCH scheduling, the UE may detect/decode a PDCCH only on the corresponding DL CCs. The BS may transmit the PDCCH only through the monitoring DL CC (set). The monitoring DL CC set may be set UE-specifically, UE-group-specifically or cell-specifically.

Figure 10:
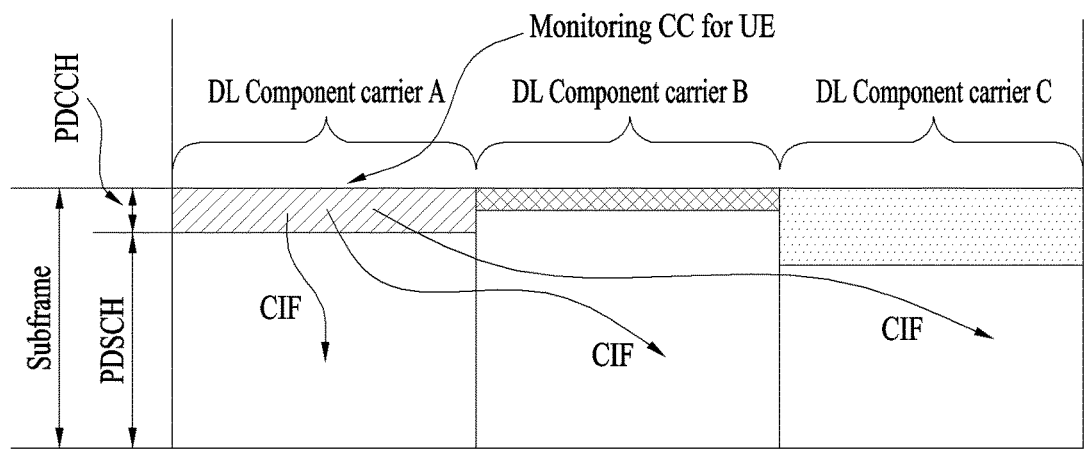
FIG. 10 illustrates cross-carrier scheduling.

FIG. 10 illustrates scheduling when a plurality of carriers is aggregated. It is assumed that 3 DL CCs are aggregated and DL CC A is set to a PDCCH CC. DL CC A~C may be referred to as a serving CC, serving carrier, serving cell, etc. When the CIF is disabled, each DL CC can transmit only a PDCCH that schedules a PDSCH corresponding to the DL CC without a CIF according to LTE PDCCH rule (non-cross-CC scheduling). When the CIF is enabled through UE-specific (or UE-group-specific or cell-specific) higher layer signaling, a specific CC (e.g. DL CC A) can transmit not only the PDCCH that schedules the PDSCH of DL CC A but also PDCCHs that schedule PDSCHs of other DL CCs using the CIF (cross-scheduling). A PDCCH is not transmitted on DL CC B and DL CC C.

Figure 11:
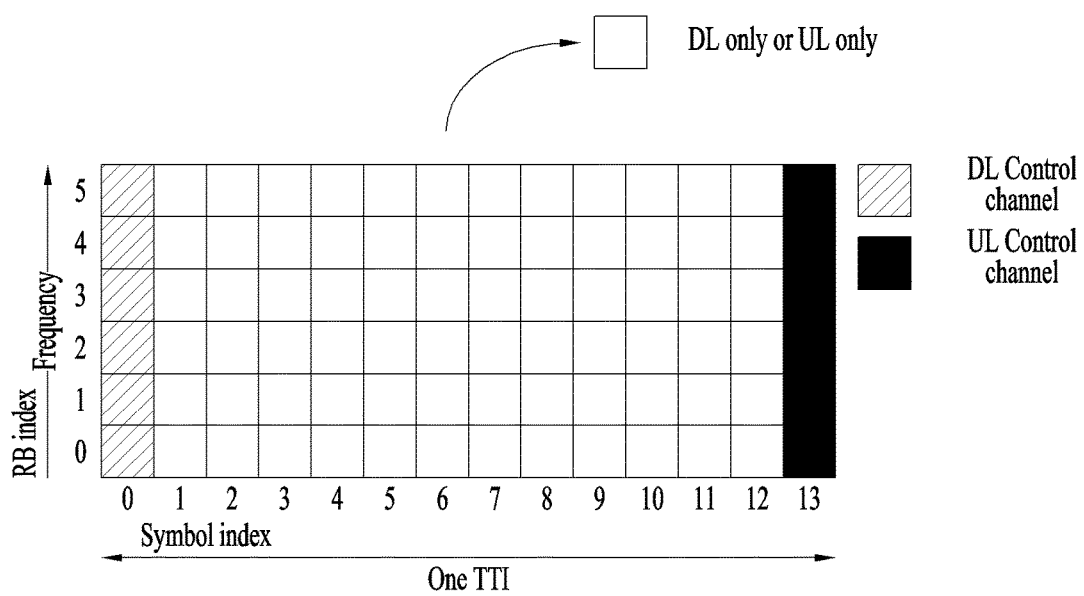
FIG. 11 illustrates a structure of a self-contained subframe.

Meanwhile, a next generation RAT (radio access technology) is considering a self-contained subframe to minimize data transmission latency. FIG. 11 illustrates a structure of a self-contained subframe. In FIG. 11, oblique line areas indicate downlink control regions and black colored areas indicate uplink control regions. Areas having no mark may be used for DL data transmission or UL data transmission. In this structure, DL transmission and UL transmission are performed in due order within one subframe, whereby DL data transmission and UL ACK/NACK transmission can be performed within the subframe. As a result, the time required for data re-transmission may be reduced when an error occurs in data transmission, whereby latency of final data transfer may be minimized.

Examples of the self-contained subframe type that may be configured in the system may consider four subframe types as follows.
   DL control period+DL data period+GP (guard period)+ UL control period
   DL control period+DL data period
   DL control period+GP+UL data period+UL control period
   DL control period+GP+UL data period PDFICH, PHICH, and PDCCH can be transmitted in a DL control period and PDSCH can be transmitted in a DL data period. PUCCH can be transmitted in a UL control period and PUSCH can be transmitted in a UL data period. A time gap for switching from a transmission mode to a reception mode or vice versa is required for an eNB and a UE. A GP provides the time gap. To this end, some OFDM symbols at the time when DL is switched to UL in the self-contained subframe structure are configured as a GP.

Embodiment

Unlike a legacy LTE system operating based on a fixed DL/UL SF configuration, a new RAT system may consider an operation of dynamically changing a DL/UL resource (e.g., data region) portion or a DL/UL resource portion within multiple SF sections according to a DL/UL traffic status based on the self-contained SF type mentioned earlier in FIG. 11 (i.e., dynamic TDD). The present invention proposes a DL/UL resource configuration for a new RAT system and a UE operation method according to the DL/UL resource configuration. In the following description, a symbol includes an OFDMA-based symbol (e.g., OFDM(A) symbol and an SC-FDM(A) symbol).

(1) Dynamic TDD Operation with Static DL/UL Resource

In order to reduce RS overhead in DL, the new RAT may consider a method of performing transmission by scheduling an RS specialized for a specific function only by detaching a legacy CRS function (e.g., DL control/data channel demodulation, tracking performed on DL synchronization, various measurements performed on CSI/RRM (radio resource management), and the like). Or, the new RAT may consider a method of performing transmission with a specific period when the transmission is necessary only. For example, in the new RAT, a DL RS can be classified into a DRS (demodulation RS) for demodulating a DL control/data channel, a TRS (tracking RS) for tracking DL sync, a CSI-RS for measuring CSI, and an RRM-RS for measuring RRM. In particular, the DRS is transmitted at the timing at which a DL control/data channel is scheduled/transmitted and the TRS and CSI/RS/RRM-RS can be transmitted in accordance with a period at which tracking and CSI/RRM measurement are required. Besides, a synchronization signal (i.e., sync-signal) and system information (i.e., system-info) can also be regarded as signals basically requiring periodic transmission in DL.

Meanwhile, in UL of the new RAT, it may consider not only HARQ-ACK feedback according to DL data scheduling but also UCI feedback requiring periodic transmission via a UL control channel such as SR or periodic CSI. Hence, it is necessary to periodically reserve a UL resource to be used for transmitting periodic UCI feedback (a UL control channel carrying the periodic UCI feedback). In the new RAT, it is necessary to periodically reserve a UL resource to perform a periodic SRS transmission for UL radio channel sounding, a PRACH transmission for UL random access, and a contention-based UL signal transmission (CB-ULTX).

In consideration of this, a base station/UE may operate in a state that a periodic resource configured for transmitting a specific DL signal is regarded/assumed as a static DL resource (in the aspect of the UE). The specific DL signal can include at least one selected from the group consisting of a TRS, a CSI-RS, an RRM-RS, a sync-signal, and system-info. As a different method, it may consider a method that a base station directly sets a static DL resource having a specific period to a UE and the base station/UE may operate based on the static DL resource. When the static DL resource is assumed, for example, if DL/UL reception/ transmission is scheduled to the static DL resource, the UE may ignore/omit the DL/UL reception/transmission for the whole of the DL/UL reception/transmission or a part corresponding to the static DL resource only among the DL/UL reception/transmission.

A static DL resource is configured by DL only and DL/UL is not dynamically changed in the static DL resource. The static DL resource can be set to the whole of an SF or a specific (e.g., first) partial symbol period (or, a partial RE of the symbol period). In an SF, the remaining symbols except the static DL resource symbol period can be configured by DL or UL depending on a status (hereinafter, a flexible UL/DL resource, a dynamic resource). And, the static DL resource can include at least one selected from the group consisting of a TRS, a CSI-RS, an RRM-RS, a sync-signal, and system-info. For example, a transmission of a specific DL signal (e.g., TRS, CSI-RS, RRM-RS, sync-signal, and system-info) can be set to a specific (e.g., first) partial symbol period (partial RE within the period) only within an SF. An SF to which a static DL resource is set can be configured to basically include a period in which a DL data channel is transmitted. The DL data channel includes PDSCH.

Meanwhile, in new RAT, a resource (e.g., PDCCH UE-specific search space) capable of transmitting/detecting a UE-specific DL control channel can be defined/designated to be randomly set to all SFs. On the other hand, a resource (e.g., PDCCH common search space) capable of transmitting/detecting a UE-common DL control channel can be defined/designated to be set to a specific partial SF only rather than all SFs. Hence, a base station/UE may operate in a state that a UE-common control resource is regarded/assumed as a static DL resource (in the aspect of the UE). And, the base station can directly set a static DL resource having a specific period including UE-common control transmission to the UE. The UE-common control resource can be set to a specific (e.g., first) partial symbol period (or a specific partial RE within the symbol period) within an SF. The SF to which the UE-common control resource is set can be configured to basically include a period in which a DL data channel is transmitted.

Meanwhile, in the new RAT, (i) a time unit (e.g., a TTI or a period of detecting (e.g., BD) scheduling DCI for data) of scheduling/transmitting a UE-common data and (ii) a time unit of scheduling/transmitting a UE-specific data can be differently set to the same UE. The UE-common data includes broadcast data such as an SIB (system information block), an RAR (random access response), a paging message, and the like. The UE-specific data includes unicast data such as a PDSCH carrying DL-SCH, PUSCH carrying UL-SCH, and the like. Hence, a time period (TTI) for which single UE-common data is transmitted may be different from a time period for which a single UE-specific data is transmitted for the same UE. And, a period of detecting scheduling DCI on the UE-common data and/or DCI including a UE-common command (hereinafter, UE-common DCI) and scheduling DCI on the UE-specific data and/or DCI including a UE-specific command (hereinafter, UE-specific DCI) can be differently set to the same UE.

Meanwhile, the timing/period at which BD is performed on the UE-specific DCI can be configured by a base station at appropriate timing (after initial access). Hence, it is necessary for a UE to have timing/period at which BD is performed (on the UE-specific DCI) (e.g., default configuration) to be assumed by the UE before configuration information is given by the base station. As an example of the default configuration, the UE can be configured to perform BD on the UE-specific DCI in every specific unit time period (e.g., a subframe, a slot, or a time period configured by the number of symbols corresponding to a divisor of the total number of symbols within a subframe) based on a specific OFDM numerology (e.g., subcarrier spacing (SCS) or in every period corresponding to a specific multiple of the time period. In this case, a specific SCS (i.e., basic SCS) can be designated in a manner of being identical to an SCS applied to a specific UE-common signal/channel (e.g., synchronization signal, (broadcast) system information). As a different example, if timing/period of performing BD on the UE-common DCI is given (in a predefined form), the UE can be configured to perform BD on the UE-specific DCI (at the timing/period identical to the timing/period at which BD is performed on the UE-common DCI) in a state that the timing/period of performing BD on the UE-common DCI is regarded as the default configuration for the UE-specific DCI. As a further different example, information on the timing/period of performing BD on the UE-specific DCI can be configured via (broadcast) system information (i.e., the same timing/period of performing BD is set to UEs before a UE-specific configuration is provided). Or, the information can be configured via an RAR or an Msg4 (message4) PDSCH (which is transmitted for a random access contention resolution).

In case of DL/UL SPS (semi-persistent scheduling), information on a subframe in which SPS Tx/Rx is to be performed is provided via RRC (radio resource control) signaling. Activation, reactivation, and release of the SPS are performed via PDCCH. The information on the subframe for the SPS includes a subframe interval and a subframe offset. For clarity, PDCCH for indicating activation/reactivation/release of the SPS is referred to as an SPS PDCCH. The SPS PDCCH carries RB allocation information for SPS Tx/Rx and MCS (modulation and coding scheme) information. In case of the SPS PCDDH, a CRC (cyclic redundancy check) is masked with an SPS C-RNTI (cell radio network temporary identifier) and NDI=0 is set. Hence, although a UE receives information on a subframe in which SPS is to be performed (simply, SPS subframe) via RRC signaling, the UE does not immediately perform the SPS Tx/Rx. If the UE receives SPS PDCCH indicating SPS activation (or reactivation), the UE performs SPS Tx (e.g., PUSCH transmission) or SPS Rx (e.g., PDSCH reception) in a subframe allocated via RRC signaling. The SPS Tx/Rx is performed using RB allocation information and MCS information within the SPS PDCCH in the subframe. Meanwhile, if the UE receives PDCCH indicating SPS release, the UE terminates the SPS Tx/Rx.

Meanwhile, in a new RAT operating in a form of dynamic TDD based on a self-contained subframe type, in case of a DL data scheduled/transmitted using an SPS scheme, it may be necessary to allocate an SPS DL data resource in consideration of possibility of transmitting a (potential) DL/UL control channel. To this end, it may be able to configure information on a starting/ending timing (e.g., starting/ending symbol index) of SPS DL data transmission (within a single SF or TTI). The information can be indicated via DCI which is transmitted to activate DL SPS. In this case, the ending timing of the SPS DL transmission can be configured by a symbol (index) positioned prior to the last symbol of an SF/TTI. Meanwhile, when a specific (e.g., dynamic/non-SPS) UL data/control channel (e.g., PUSCH/PUCCH) is scheduled/indicated to be transmitted via a resource/timing configured to transmit SPS DL data, a UE can be configured to perform the scheduled/indicated UL data/control channel transmission in a state that the UE omits/abandons SPS DL data reception in the resource/timing. If SPS DL data and a specific UL data/control channel exist at the same timing (e.g., SF), SPS DL data reception can be omitted irrespective of whether or not the SPS DL data is actually overlapped with the specific UL data/control channel (on a physical resource).

And, a base station/UE may operate in a state that a periodic resource configured to transmit a specific UL signal is regarded/assumed as a static UL resource which is not changed (in the aspect of the UE). The specific UL signal can include at least one selected from the group consisting of an SR, periodic CSI, periodic SRS, PRACH, and CB-ULTX. As a different method, it may consider a scheme that a base station directly sets a static UL resource having a specific period to a UE and the base station/UE can operate based on the static UL resource. As an example of operating in the state that the static UL resource is regarded/assumed, if DL/UL reception/transmission is scheduled to the static UL resource, the UE can ignore/omit the DL/UL reception/transmission for the whole of the DL/UL transmission or a part corresponding to the static UL resource only among the DL/UL reception/transmission.

A static UL resource is configured by UL only and DL/UL is not dynamically changed. The UL resource can be set to the whole of an SF or a specific (e.g., last) partial symbol period (or a specific partial RE within the symbol period). In an SF, the remaining symbols except a static UL resource symbol period can be configured by DL or UL depending on a situation (hereinafter, a flexible UL/DL resource, a dynamic resource). And, the static UL resource can include at least one selected from the group consisting of an SR, periodic CSI, periodic SRS, PRACH, and CB-ULTX. For example, transmission of a specific UL signal (e.g., SR, periodic CSI, periodic SRS, PRACH, CB-ULTX) can be set to a specific partial (e.g., last) symbol period (specific partial RE in the period) only within an SF. When a static UL resource is set to an SF, the SF can be configured to basically include a section in which a UL data channel is transmitted. The UL data channel includes PUSCH. In addition, it may be able to differently configure an SF including a section in which a UL control channel is transmitted according to UCI. For example, an SR (and/or HARQ-ACK) and a section in which a UL control channel corresponding to periodic CSI is transmitted can be set to a different SF. The UL control channel includes PUCCH.

Meanwhile, in the new RAT, it may be able to differently configure (i) a time unit (e.g., a TTI or a period of detecting (BD) scheduling DCI for corresponding data) of scheduling/transmitting a specific UL data (e.g., UL data (e.g., Msg3 PUSCH scheduled from RAR) accompanied with an initial access procedure or a random access procedure) and (ii) a time unit of scheduling/transmitting a normal UL data (e.g., unicast data such as PUSCH on which UE-specific UL-SCH is carried). In particular, a time section (TTI) during which a single specific UL data is transmitted and a time section during which a single normal UL data is transmitted can be differently configured in the aspect of a UE. And, a period of detecting scheduling DCI for a specific UL data (or scheduling DCI for RAR) and a period of detecting scheduling DCI for a normal UL data can be differently configured.

Meanwhile, in a new RAT operating in a form of dynamic TDD based on a self-contained subframe type, in case of a UL data scheduled/transmitted using an SPS scheme, it may be necessary to allocate an SPS UL data resource in consideration of possibility of transmitting a (potential) DL/UL control channel. To this end, it may be able to configure information on a starting/ending timing (e.g., starting/ending symbol index) of SPS UL data transmission (within a single SF or TTI). The information can be indicated via DCI which is transmitted to activate UL SPS. In this case, the starting timing of the SPS UL data transmission can be configured by a symbol index positioned after the first symbol of an SF/TTI. Meanwhile, when a specific (e.g., non-SPS) DL data/control channel (e.g., PDSCH/PDCCH) is scheduled/indicated to be received via a resource/timing configured to transmit SPS UL data, a UE can be configured to perform the scheduled/indicated DL data/control channel reception in a state that the UE omits/abandons SPS UL data transmission in the resource/timing. If SPS UL data transmission and a specific DL data/control channel exist at the same timing (e.g., SF), SPS UL data transmission can be omitted irrespective of whether or not the SPS UL data transmission is actually overlapped with the specific DL data/control channel (on a physical resource).

Figure 12:
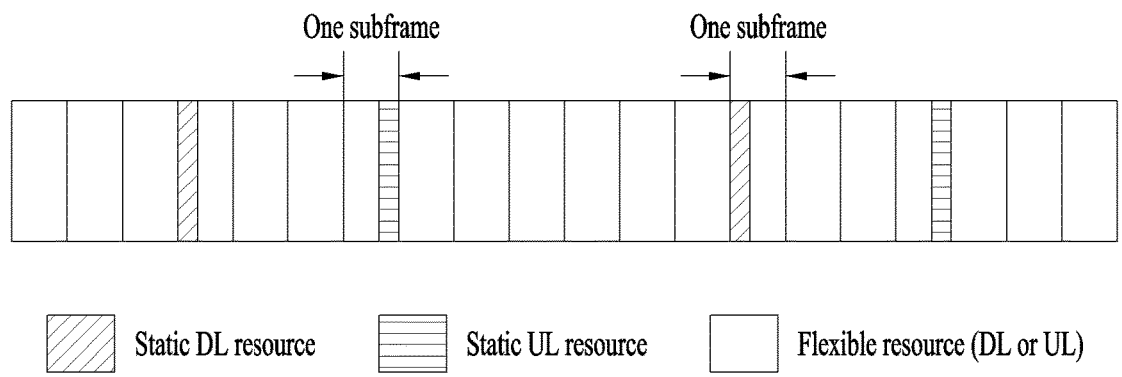
FIG. 12 illustrates a signal transmission structure according to the present invention.

FIG. 12 illustrates a signal transmission structure according to the present invention. Referring to FIG. 12, when a DL/UL resource is configured, DL/UL can be dynamically changed for the remaining resources (i.e., flexible DL/UL resource, a dynamic resource) only except the static DL/UL resource (dynamic TDD form). It may be able to dynamically change DL/UL for a flexible DL/UL resource based on the self-contained SF type shown in FIG. 11.

(2) DL/UL Data Transmission with Static DL/UL Resource

In the new RAT, it may consider not only a legacy single-SF scheduling scheme that schedules/transmits a TB/data channel (e.g., PDSCH/PUSCH) of a single SF only using a single scheduling information/control channel, but also a multi-SF scheduling scheme that schedules/transmits one or more TBs/data channels (e.g., PDSCH/PUSCH) over a plurality of SFs using a single scheduling information/control channel. In this case, when a DL/UL data transmission resource (i.e., dynamic DL/UL resource) (e.g., symbol) (dynamically) scheduled by a base station is overlapped with a static DL/UL resource, it is necessary to define a UE operation.

First of all, if a UL data transmission resource is overlapped with a static UL resource, a UE may not map/transmit a UL data signal to an overlapped resource (symbol unit or RE (or RB) unit) all the time (by applying rate matching or puncturing). In this case, the overlapped resource can be used as a static UL resource. Or, information on whether or not a UL data signal is mapped/transmitted to the overlapped resource can be directly indicated via a UL scheduling grant. A UL data signal can be normally mapped/transmitted to resources rather than the overlapped resource. And, if a DL data transmission resource is overlapped with a static UL resource, a UE may not map/receive a DL data signal for an overlapped resource (and a GP immediately before the static UL resource) all the time (by applying rate matching or puncturing). In this case, the overlapped resource can be used as a static UL resource. Or, information on whether or not a DL data signal is mapped/received to the overlapped resource (and a GP immediately before the static UL resource) can be directly indicated via a DL scheduling grant. A DL data signal can be normally mapped/received to resources rather than the overlapped resource.

Subsequently, if a UL data transmission resource is overlapped with a static DL resource, a UE may not map/transmit a UL data signal to an overlapped resource (and a GP immediately after the static DL resource) (by applying rate matching or puncturing). In this case, the overlapped resource can be used as a static DL resource. Or, information on whether or not a UL data signal is mapped/transmitted to the overlapped resource can be directly indicated via a UL scheduling grant. A UL data signal can be normally mapped/transmitted to resources rather than the overlapped resource (and a GP immediately after the static DL resource). And, if a DL data transmission resource is overlapped with a static DL resource, a UE may not map/receive a DL data signal for an overlapped resource (symbol unit or RE (or RB) unit) (by applying rate matching or puncturing). In this case, the overlapped resource can be used as a static DL resource. Or, information on whether or not a DL data signal is mapped/received to the overlapped resource can be directly indicated via a DL scheduling grant. A DL data signal can be normally mapped/received to resources rather than the overlapped resource.

As a different method, it may apply the single-SF scheduling scheme only to an SF including a static DL/UL resource. Hence, 1) an SF including a static DL/UL resource may not be included in multi-SF scheduling target SFs and 2) multi-SF scheduling that schedules an SF before an SF including a static DL/UL resource and an SF after the SF including the static DL/UL resource may not be allowed.

Meanwhile, information on a static DL/UL resource (or a periodic DL/UL transmission resource corresponding to the static DL/UL resource) can be signaled via a specific broadcast signal (e.g., system-info) (to identify the information at the initial access timing) in consideration of other impacts including DL/UL data signal mapping.

(3) Multi-SF Scheduling and HARQ-ACK Resource Reservation

Multi-SF scheduling has a merit in that it is able to reduce DL control resource overhead. On the other hand, it is necessary to have an appropriate rule or a restriction to reduce unnecessary UE operation and resource overhead (in the aspect of a resource transmitting HARQ-ACK feedback in response to DL data scheduling). For clarity, a plurality of SFs on which the multi-SF scheduling is to be performed are referred to as a multi-SF window and assume that it is able to perform single-SF scheduling on each of a plurality of the SFs. A size of the multi-SF window corresponds to the number of SFs belonging to the multi-SF window, i.e., the number of SFs on which the multi-SF scheduling is to be performed.

To this end, it may consider a scheme that an SF capable of being configured as a starting SF of the multi-SF window (or, an SF in which a multi-SF scheduling grant is transmittable) is restricted to a specific SF index only. And, it may be able to identically or differently configure a multi-SF window size according to an index of an SF (capable of being configured as a starting SF of the multi-SF window). And, a multi-SF window corresponding to each index of an SF (capable of being configured as a starting SF of the multi-SF window) can be configured to be overlapped or not to be overlapped. For clarity, assume that an amount of resources for transmitting HARQ-ACK corresponding to the entire DL data scheduling for a single SF corresponds to N. For example, it may assume that the total amount of resources for transmitting a DL grant configured/set to a single SF or the total amount of resources (e.g., the number of PUCCH resources) for transmitting HARQ-ACK linked with a DL data transmission resource corresponds to N. In this case, assume that a HARQ-ACK transmission resource is able to transmit not only HARQ-ACK for single-SF scheduling but also HARQ-ACK for multi-SF scheduling. For example, when 4 SFs are scheduled by multi-SF scheduling, HARQ-ACK information on the 4 SFs can be transmitted using a single HARQ-ACK transmission resource (e.g., a single physical channel (e.g., PUCCH)).

As an example of the abovementioned method, a multi-SF window size corresponding to a (starting) SF index, which is multiple of 2, is configured by two SFs and a multi-SF window size corresponding to a (starting) SF index, which is multiple of 4, is configured by four SFs (in consideration of a tree structure). In this case, a plurality of different multi-SF window sizes can be set to the same SF index or multi-SF windows corresponding to a plurality of different SF indexes can be overlapped with each other in a single SF. In this case, an amount of resources for transmitting HARQ-ACK corresponding to the last SF of a multi-SF window having a size of two SFs (an SF index corresponds to a multiple of 4) can be configured by 2N. And, an amount of resources for transmitting HARQ-ACK corresponding to the last SF of a multi-SF window having a size of four SFs (an SF index corresponds to a multiple of 4) can be configured by 3N. An amount of resources for transmitting HARQ-ACK corresponding to the remaining SFs can be configured by N. In particular, an amount of resources for transmitting HARQ-ACK set to a specific SF (e.g., an SF in which HARQ-ACK is transmitted) can be determined according to the last SF to which the specific SF corresponds among the total number of multi-SF windows (including single-SF scheduling). For example, it may assume single/multi-SF scheduling as follows.

TABLE 4

| SF Index | SF #4n | SF #4n + 1 | SF #4n + 2 | SF #4n + 3 |
|---|---|---|---|---|
| Possible scheduling methods | Multi-SF window (size: 4 SFs) | | | |
| | Multi-SF window (size: 2 SFs) | | Multi-SF window (size: 2 SFs) | |
| | Single-SF scheduling | Single-SF scheduling | Single-SF scheduling | Single-SF scheduling |
| Amount of HARQ-ACK resources (HARQ-ACK Tx SF) | N | 2N | N | 3N |

In this case, an SF #4n+1 corresponds to the last SF of SF=2 multi-SF window and single-SF scheduling is permitted in an SF #4n+1. Hence, an amount of resources for transmitting HARQ-ACK corresponding to the SF #4n+1 is configured by 2N. If it is assumed that resources (e.g., PUCCH resource) for transmitting HARQ-ACK are indexed by 0 to 2N−1, HARQ-ACK information on single-SF scheduling is transmitted using one of the HARQ-ACK transmission resources 0 to N−1. HARQ-ACK information on SF=2 multi-SF window can be transmitted using one of HARQ-ACK transmission resources N to 2N−1. A HARQ-ACK transmission resource may correspond to a PUCCH resource. And, an SF #4n+3 corresponds to the last SF of SF=2/SF=4 multi-SF window and single-SF scheduling is permitted in the SF #4n+3. Hence, an amount of resources for transmitting HARQ-ACK corresponding to the SF #4n+3 is configured by 3N. If it is assumed that resources (e.g., PUCCH resource) for transmitting HARQ-ACK are indexed by 0 to 3N−1, HARQ-ACK information on single-SF scheduling is transmitted using one of the HARQ-ACK transmission resources 0 to N−1. HARQ-ACK information on SF=2 multi-SF window is transmitted using one of HARQ-ACK transmission resources N to 2N−1 and HARQ-ACK information on SF=4 multi-SF window can be transmitted using one of HARQ-ACK transmission resources 2N to 3N−1.

In relation to this, an SF in which HARQ-ACK is transmitted corresponding to an SF #k can be configured by an SF

(k+Dm) (based on definition described in the following). In case of multi-SF scheduling, the SF #k corresponds to the last SF within a multi-SF window and HARQ-ACK information on SFs belonging to the multi-SF window can be transmitted in the SF #(k+Dm). Hence, if a DL signal requesting HARQ-ACK feedback is detected (i) in the SF #k (in case of single-SF scheduling) or (ii) in a multi-SF window having the SF #k as the last SF (in case of multi-SF scheduling), HARQ-ACK information can be transmitted in the SF #(k+Dm) in response to the DL signal. The DL signal requesting the HARQ-ACK feedback includes PDSCH and PDCCH indicating SPS release.

As a different example, it may consider a scheme of configuring a multi-SF window size by 4 SFs for a (starting) SF index corresponding to a multiple of 2 only. In this case, it may be able to configure multi-SF windows corresponding to SF indexes different from each other to be (partially) overlapped. As a further different example, it may consider a scheme of configuring a multi-SF window size by 2 SFs for a (starting) SF index corresponding to a multiple of 2 only. In this case, multi-SF windows corresponding to SF indexes different from each other are not overlapped. As a further different example, a multi-SF window size corresponding to {10 k+0} or {10 k+5} and a multi-SF window size corresponding to {10 k+2} or {10 k+7} can be configured by 2 SFs and 3 SFs, respectively, (on the basis of 10 SF sections) (where k 0, 1, . . . ). In this case, multi-SF windows corresponding to SF indexes different from each other are not overlapped. In the abovementioned 3 examples, an amount of resources for transmitting HARQ-ACK corresponding to the last SF of each multi-SF window can be configured by 2N and an amount of resources for transmitting HARQ-ACK corresponding to the remaining SFs can be configured by N.

As a different approach, when the number of types of a multi-SF window size is restricted, it may consider a scheme of configuring a HARQ-ACK resource amount corresponding to each SF in consideration of the restriction. For example, when a multi-SF window has the M number of sizes and there is no special restriction on a starting SF index of the multi-SF window, a HARQ-ACK resource amount corresponding to each SF can be configured by {(M+1)×N}. This is because each SF may correspond to the last SF of the M number of multi-SF windows and it is able to apply single-SF scheduling to each SF. Meanwhile, the multi-SF window size configuration and the multi-SF window configuration scheme can be similarly applied not only to DL multi-SF scheduling but also to UL multi-SF scheduling.

Meanwhile, in order to more flexibly manage DL/UL resources in the new RAT, it may consider a scheme of directly indicating HARQ-ACK transmission timing corresponding to DL data reception timing via a DL scheduling grant. For example, if it is assumed that minimum delay between DL data and HARQ-ACK corresponds to the Dm number of SFs and HARQ-ACK delay indicated via a DL grant corresponds to the Dg number of SFs (Dg=0, 1, . . . ), time corresponding to the (Dm+Dg) number of SFs can be determined as delay between DL data and HARQ-ACK. In this case, a HARQ-ACK resource index, which is determined by adding an offset corresponding to (Dg×N) to a DL grant in an SF #k or a HARQ-ACK resource index which is implicitly determined from a DL data transmission resource, can be allocated as a final HARQ-ACK transmission resource in an SF #(k+Dm+Dg) corresponding to DL data. For example, equation 1 can be modified as follows.

Specifically, in LTE system, a PUCCH resource index is determined as follows.

$$n^{(x)}_{PUCCH} = n_{CCE} + Dg \times N + N^{(x)}_{PUCCH}$$ [Equation 2]

In this case, $n^{(x)}_{PUCCH}$ corresponds to a resource index of a PUCCH format x for transmitting a HARQ-ACK response (i.e., ACK/NACK/DTX), $N^{(x)}_{PUCCH}$ corresponds to a signaling value forwarded from a higher layer, and $n_{CCE}$ corresponds to the smallest value among CCE indexes used for DL grant PDCCH transmission. Dg corresponds to the number of SFs corresponding to HARQ-ACK delay indicated via a DL grant PDCCH and N corresponds to an amount of resources for transmitting HARQ-ACK corresponding to the entire DL data scheduling for a single SF.

Meanwhile, it may be able to differently configure a CP length 1) according to an SF, 2) between DL transmission and UL transmission, and/or 3) between a data channel and a control channel in accordance with DL/UL data scheduling and DL/UL signal transmission/reception target UE. Information on the CP length 1) is semi-statically configured via higher layer signaling (RRC signaling), 2) is dynamically transmitted via a UE-common signal, 3) can be dynamically indicated via a DL/UL grant. For example, it is able to indicate information on a CP length (and/or the number of symbols in which DL data is transmitted) used for transmitting a DL data channel scheduled via a DL grant and HARQ-ACK feedback (in a state that the CP length information for transmitting the DL/UL control channel is configured in advance). And, it is able to indicate information on a CP length (and/or the number of symbols in which UL data is transmitted) used for transmitting a UL data channel scheduled via a UL grant. By doing so, a UE is able to configure a symbol in which DL/UL data is transmitted based on an indicated CP length. It is able to differently configure/determine the number of symbols transmitted via a given (same) DL/UL data section according to the indicated CP length.

Figure 13:
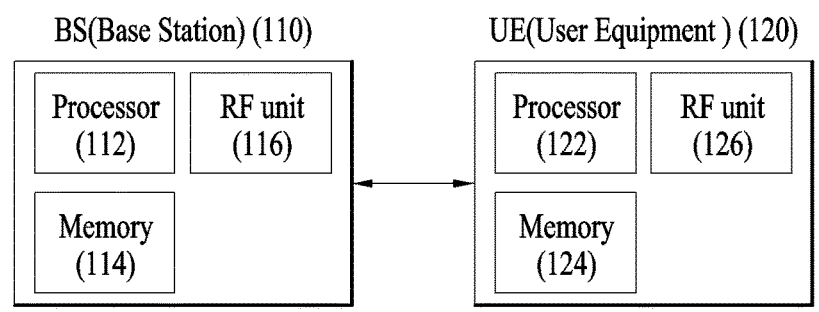
FIG. 13 illustrates a base station and a user equipment applicable to an embodiment of the present invention.

FIG. 13 illustrates a BS and a UE of a wireless communication system, which are applicable to embodiments of the present invention.

Referring to FIG. 13, the wireless communication system includes a BS 110 and a UE 120. When the wireless communication system includes a relay, the BS or UE may be replaced by the relay.

The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'LIE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to UEs, eNBs or other apparatuses of a wireless mobile communication system.

What is claimed is:

1. A method of performing communication by a user equipment (UE) in a wireless communication system, the method comprising:
    identifying a static downlink (DL) resource and a static uplink (UL) resource, in a resource region including a plurality of subframes; and
    transmitting or receiving data based on flexible resources in the resource region,
    wherein the static DL resource is a part of symbols of a first subframe and the static UL resource is a part of symbols of a second subframe, the first and the second subframes are included in the plurality of subframes,
    wherein the static DL resource and the static UL resource are used for DL reception and UL transmission of predetermined signals, and
    wherein the flexible resources are all of remaining resources except the static DL resource and the static UL resource in the resource region, and dynamically configured for DL data reception or UL data transmission based on scheduling information of a base station.

2. The method of claim 1, wherein the static DL resource contains a DL resource periodically configured to receive a specific DL signal, and
    wherein the specific DL signal contains at least one of a tracking reference signal (TRS), a channel state information RS (CSI-RS), a radio resource management RS (RRM-RS), a synchronization signal, and a system information signal.

3. The method of claim 2, wherein when the static DL resource is overlapped with a scheduled UL data transmission resource, UL data transmission is not performed in a resource at which the static DL resource and the scheduled UL data transmission resource are overlapped and a guard period (GP) appears after the resource.

4. The method of claim 1, wherein the static UL resource contains a UL resource periodically configured to transmit a specific UL signal, and
    wherein the specific UL signal contains at least one of a scheduling request (SR), periodic channel state information (CSI), a periodic sounding reference signal (SRS), a physical random access channel (PRACH), and contention-based uplink transmission (CB-ULTX).

5. The method of claim 4, wherein when the static UL resource is overlapped with a scheduled DL data reception resource, DL data reception is not performed in a resource at which the static UL resource and the scheduled DL data reception resource are overlapped and a guard period (GP) appears prior to the resource.

6. A user equipment (UE) in a wireless communication system, comprising:
    a radio frequency (RF) module; and
    at least one processor,
    wherein the at least one processor is configured to:
    identify a static downlink (DL) resource and a static uplink (UL) resource, in a resource region including a plurality of subframes, and
    transmit or receive data based on flexible resources in the resource region,
    wherein the static DL resource is a part of symbols of a first subframe and the static UL resource is a part of symbols of a second subframe, the first and the second subframes are included in the plurality of subframes,
    wherein the static DL resource and the static UL resource are used for DL reception and UL transmission of predetermined signals, and
    wherein the flexible resources are all of remaining resources except the static DL resource and the static UL resource in the resource region, and dynamically configured for DL data reception or UL data transmission based on scheduling information of a base station.

7. The UE of claim 6, wherein the static DL resource contains a DL resource periodically configured to receive a specific DL signal, and
    wherein the specific DL signal contains at least one of a tracking reference signal (TRS), a channel state information RS (CSI-RS), a radio resource management RS (RRM-RS), a synchronization signal, and a system information signal.

8. The UE of claim 7, wherein when the static DL resource is overlapped with a scheduled UL data transmission resource, UL data transmission is not performed in a resource at which the static DL resource and the scheduled UL data transmission resource are overlapped and a guard period (GP) appears after the resource.

9. The UE of claim 6, wherein the static UL resource contains a UL resource periodically configured to transmit a specific UL signal, and
wherein the specific UL signal contains at least one of a scheduling request (SR), periodic channel state information (CSI), a periodic sounding reference signal (SRS), a physical random access channel (PRACH), and contention-based uplink transmission (CB-ULTX).

10. The UE of claim 9, wherein when the static UL resource is overlapped with a scheduled DL data reception resource, DL data reception is not performed in a resource at which the static UL resource and the scheduled DL data reception resource are overlapped and a guard period (GP) appears prior to the resource.

* * * * *